United States Patent

[11] 3,549,896

| [72] | Inventors | John Albert Masino;<br>Eugene J. Sturdevant, Wilmington, Del. |
|---|---|---|
| [21] | Appl. No. | 676,814 |
| [22] | Filed | Oct. 20, 1967 |
| [45] | Patented | Dec. 22, 1970 |
| [73] | Assignee | E. I. duPont de Nemours and Company<br>Wilmington, Del.<br>a corporation of Delaware |

[54] APPARATUS FOR MEASURING DIMENSIONS OF AN OPAQUE OBJECT
4 Claims, 5 Drawing Figs.

[52] U.S. Cl. .................................................. 250/219,
250/222, 350/296; 356/160, 356/165
[51] Int. Cl. .................................................. G01n 21/30
[50] Field of Search ......................................... 356/156,
157, 159, 160, 162, 165, 168, 296; 250/219Wd,
219Lg, 222

[56] References Cited
UNITED STATES PATENTS

| 3,036,219 | 5/1962 | Thompson | 250/220MX |
| 1,972,928 | 9/1934 | Ferrero et al. | 350/296X |
| 2,177,133 | 10/1939 | Desch | |
| 2,589,569 | 3/1952 | Peter et al. | 350/296 |
| 3,243,593 | 3/1966 | Starr et al. | |
| 3,259,022 | 7/1966 | Vietorisz | 250/219Wd |

*Primary Examiner*—Walter Stolwein
*Assistant Examiner*—C. M. Leedom
*Attorney*—Howard P. West, Jr.

ABSTRACT: An apparatus for measuring dimensions of a cylindrical opaque object including a mirror and a light source which forms a shadow of the object on lenses coupled to photoelectric detectors adjustably arranged around the shadow boundry. The detectors are connected to electrical circuitry where their outputs are compared to preset standard values.

PATENTED DEC 22 1970

INVENTORS
JOHN ALBERT MASINO
EUGENE J. STURDEVANT

BY *Howard P. West Jr.*
ATTORNEY

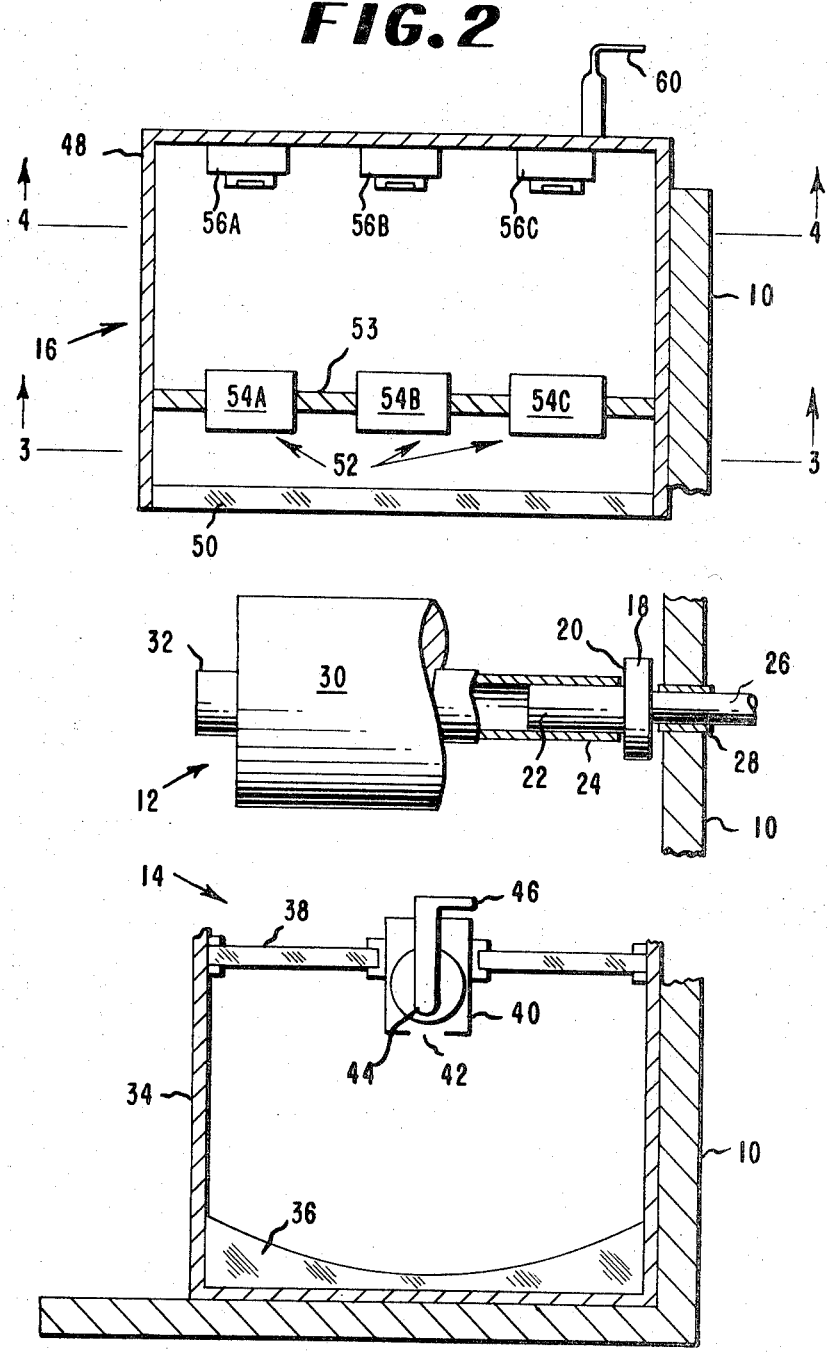

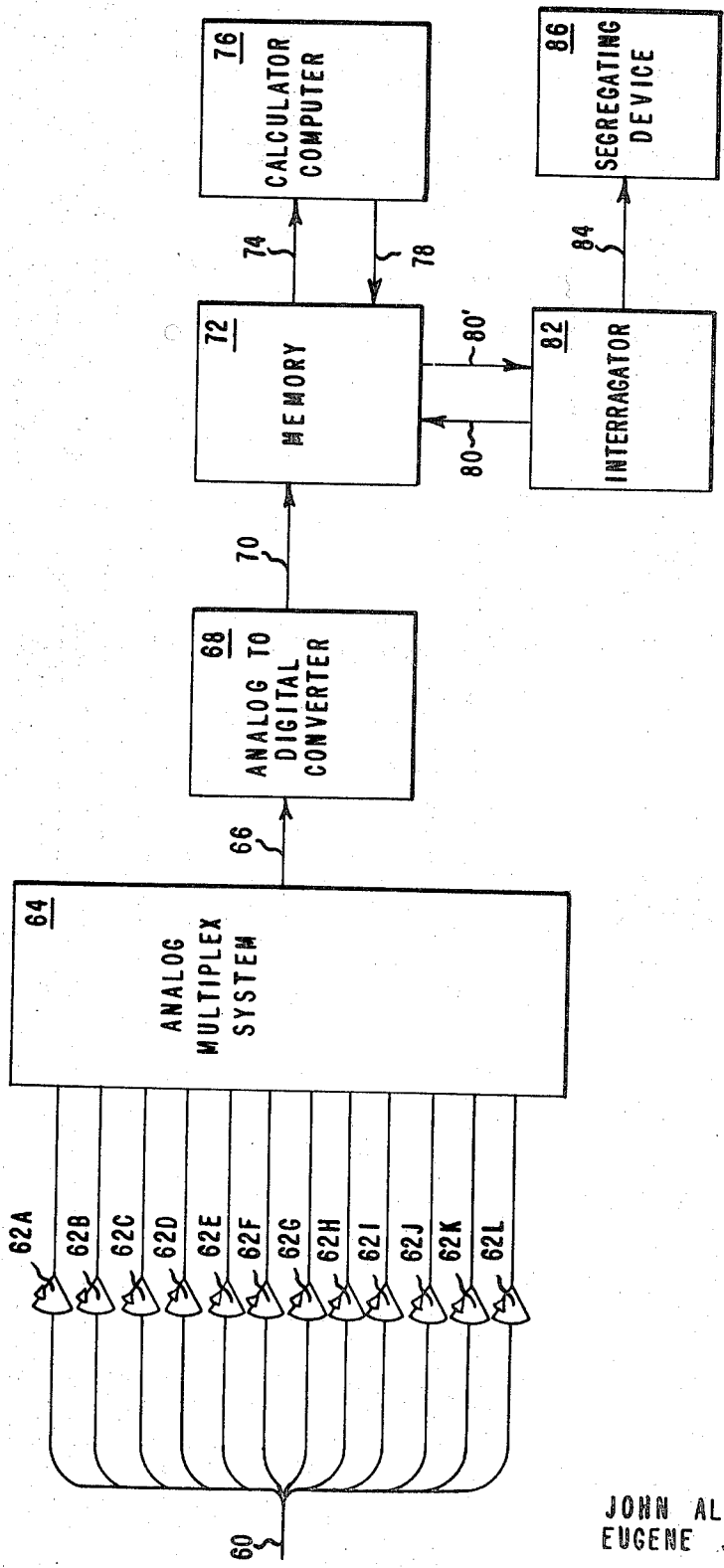

APPARATUS FOR MEASURING DIMENSIONS OF AN OPAQUE OBJECT

BACKGROUND OF THE INVENTION

This invention relates generally to objective inspection of opaque objects and, more particularly, to a photoelectric device to determine the dimensions and shape distortion of a substantially cylindrical yarn package without physical contact therewith.

Numerous prior art photoelectric devices are known which measure the diameter of a yarn, wire, rod, or the like. Such devices generally include a light source, a collimating lens system for producing parallel light rays and another optical system for receiving at least a portion of the parallel light rays and directing them to a photoelectric device. The object to be measured is positioned between the two optical systems and the amount of light reaching the cell compared to a standard is indicative of dimension of the object being measured. These devices have a deficiency when used to measure objects by means of a shadowing technique where the boundaries of a shadow cast by the object in parallel light are measured in an analog manner by detectors and appropriate circuitry. This deficiency is in the form of degraded background in the shadow plane due to stray light reaching the plane as a result of collimating lens aberration. This in turn results in low signal to noise ratio outputs from the photodetectors which greatly reduces the effectiveness of the equipment for making close tolerance measurements.

Furthermore, the prior art does not disclose a device which can measure the average diameter of a cylindrical yarn package and at the same time determine face dish or bulge, freeboard, and telescoping. By face dish or bulge is meant a distorted cylindrical package in which the generatrix is curved. Freeboard is the length of core ends not covered by the package and telescoping is associated with nonplanar package ends.

Defective package dimensions are conventionally ascertained by an operator subjectively by eye or by use of a ruler or template. Such determinations are time consuming, expensive, and prone to error in human judgment. They may also result in inadvertent damage to yarn package surfaces.

SUMMARY OF THE INVENTION

Accurate measurements of package dimensions are provided by this invention which comprises a means for mounting and axially rotating the package, a light source and a concave mirror to provide a wide collimated beam of light to cast an accurate shadow of the package. The light source and the package are successively spaced one and two mirror focal length distances respectively from the mirror. Apertured lenses and photodetectors are positioned at selected locations along the shadow boundary. Three detectors along the face boundary establish package diameter and face dish or bulge. Five detectors along one end and four along the other end of the package shadow on one side of the core ascertain that package is seated properly on a test mandrel, measure freeboard at each end, and detect package telescoping. One additional detector is provided to regulate light source intensity. Electronic circuitry takes signals from each detector, amplifies these signals, and compares their values or differences between selected signals with fixed limits and furnishes accept or reject decisions to a memory.

BRIEF DESCRIPTION OF THE DRAWINGS

FIG. 2 is an elevational view of the optical parts and package holder partially in section;

FIG. 5 is a block diagram of the electronic circuitry for analyzing signals and storing reject information.

DESCRIPTION OF THE PREFERRED EMBODIMENT

Figure 1:
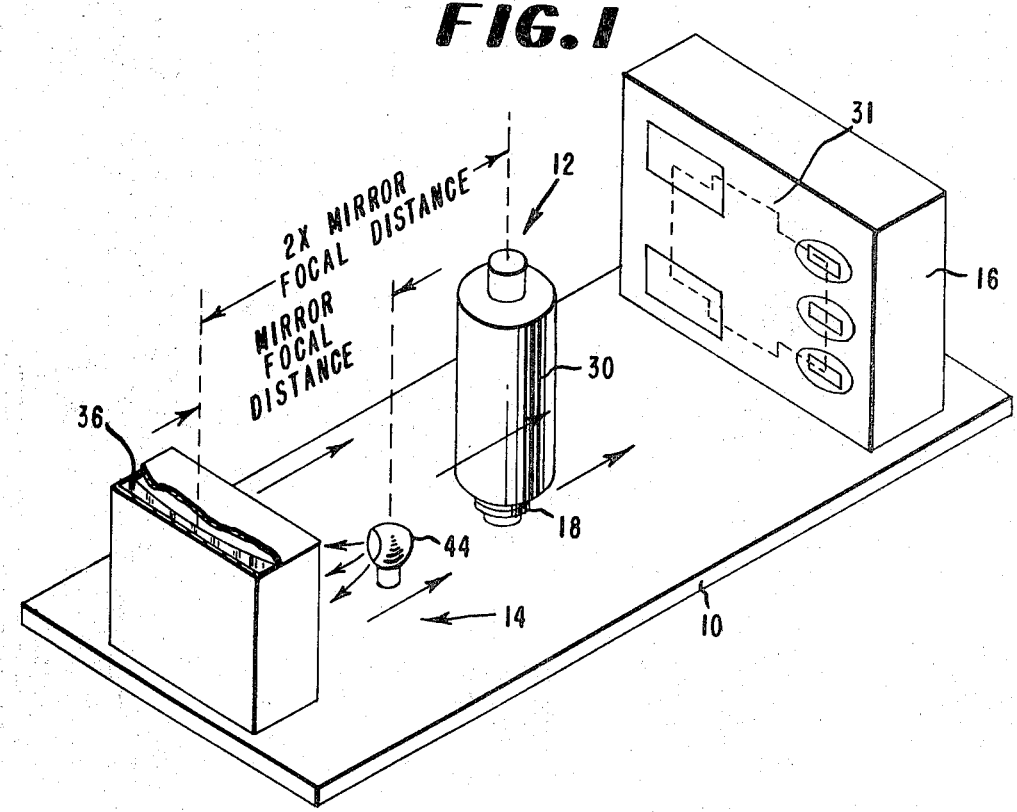
FIG. 1 is a schematic perspective view of the apparatus of this invention.

Turning first to FIG. 1, the optical and mechanical parts are seen to comprise a main frame 10 on which are mounted the package and package mounting assembly 12; an illuminator assembly 14, including mirror 36 and light source 44 providing a broad beam of collimated light; and a receiver assembly 16. The shadow boundary 31 of package 30 is indicated by dashed lines on the face of receiver assembly 16. The package holder (FIG. 2) comprises a mandrel 18 having a flat vertical surface 20 and a projecting chuck 22 sized to receive one end of a yarn package core 24 and accurately locate and support the package 30. Mandrel 18 is mounted by means of shaft 26 and bearings 28 for rotation at an accurately fixed position in frame 10. A motor (not shown) is provided for rotating mandrel 18 at a predetermined speed. A substantially cylindrical yarn package 30 on a core 32 is placed on mandrel 18 so that the end 24 of core 32 and the rotational axis of package 30 are accurately fixed in position.

Illuminator assembly 14 (FIG. 2) is seen to comprise a housing 34 having a mirror 36 positioned in one end. The other end of housing 34 is enclosed by a plate glass window 38 which is adjustably attached to housing 34. A lamp housing 40 is fixed to and projects through a hole in window 38. Housing 40 has an iris aperture 42 facing mirror 36. An incandescent lamp 44 is mounted in a conventional focusing mount inside lamp housing 40 and is energized over cable 46 from an electrical source (not shown). The filament of lamp 44 is located at the focal point of spherical mirror 36 to provide a broad beam of collimated light direct toward the yarn package 30. The center of mirror 36 is located a distance two times the focal length of the mirror from the center of package 30. In this way the image of the package formed by the mirror 36 falls back on the package since light emanating from a plane two focal lengths from a concave mirror will be reflected back to the emanating plane as an inherent feature of the mirror. Thus, the arrangement of the package two focal lengths from the mirror reduces significantly stray light reaching the detectors and increases the signal to noise ratio for the detector outputs. Lamp 44 is a Type 1209 purchased from General Electric Co. Mirror 36 is a polished glass, aluminized, concave spherical mirror having a diameter of 14 inches (35.6 cm.) and a focal length of 17 inches (43.2 cm.).

Figure 3:
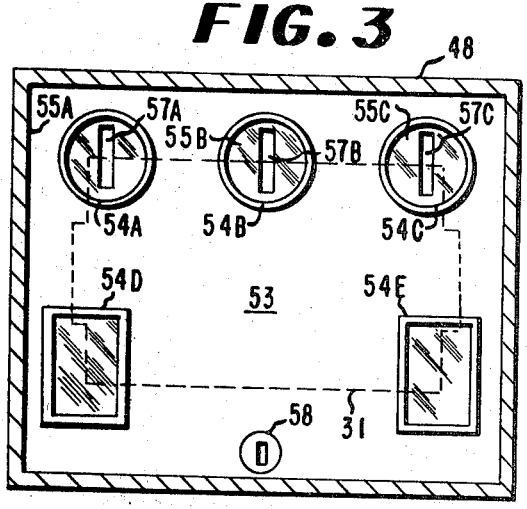
FIG. 3 is a section along lines 3-3 of FIG. 2 showing the arrangement of lenses in the detector box.

Receiver assembly 16 (FIGS. 2—4) comprises a rectangular housing 48, a plate glass window 50, a multiple lens assembly 52, and a group of twelve photodetectors 56A—56L mounted on the inside of the end of housing 48 opposite window 50. It is apparent that multiple lens assembly 52 comprises a light-tight bracket 53 of rectangular shape fixed inside housing 48. Three lens assemblies 54A, 54B, 54C, comprising circular lens mounts containing double convex spherical lenses, are mounted in three holes in a horizontal line parallel to one edge of bracket 53 and located to be centered just inside one long edge of the shadow of an average size package in order to monitor the position of the package face. Masks 55A, 55B, 55C with slits 57A, 57B, 57C cover one side of each of these lenses. Slits 57A, 57B, 57C are rectangular openings 2½ in. ×⅛in. (6.35 cm. ×0.32 cm.) with their long axes perpendicular to one face edge of shadow 31. Similarly, two additional lens assemblies 54D, 54E comprising rectangular lens mounts and cylindrical lenses are mounted in holes in bracket 53 and positioned so that their center lines are approximately adjacent the two end shadow lines, respectively, of an average yarn package to be tested. Mounted also on bracket 53 is a photodetector 58 positioned to be outside the shadow of the largest diameter package to be tested. Wires from detector 58 are included in cable 60 which lead out from receiver assembly 16. These particular wires go to a conventional circuit adapted to provide constant lamp filament intensity. The three spherical lenses are 63 mm. diameter, 100 mm. focal length achromatic, convex type, and the two cylindrical lenses are 50 mm. wide by 76.2 mm. long with 100 mm. focal length.

Figure 4:
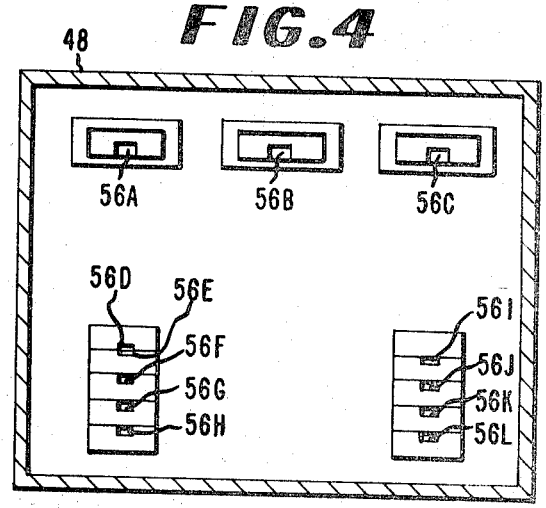
FIG. 4 is a section along 4-4 of FIG. 2 showing the arrangement of photodetectors in the detector box.

Location of the twelve primary photodetectors in housing 48 is shown on FIG. 4. Each photodetector casing has two slots at each end for adjustable mounting in a detector holder. The detector holders have slots at each side for adjustably fastening each holder to back of housing 48. Photodetectors 56A, 56B, 56C comprise each a single photocell mounted in an individual mount. Detectors 56D—56H comprise five photocells mounted in a single mounting. Similarly, detectors 56I—56L are mounted in another elongated mounting. Each photocell casing is individually adjustable in one direction and each photodetector mounting is individually adjustable in a second direction perpendicular to the first. The photocells employed are Type SS-10 from Solar Systems, Inc.

As shown in FIG. 5, the individual photodetectors are each separately connected through cable 60 to operational amplifiers 62A—62L and thence individually to analog multiplex system 64. Output from multiplex system 64 is passed over cable 66 to an analogue to digital converter 68, the output of which is passed to memory 72 over cable 70. Certain data from memory 72 is passed over cable 74 to computer 76 and computed data returned to memory 72 over cable 78. Memory 72 is further connected over cable 80 to interrogator 82, the output of which is fed over cable 84 to yarn package segregating device 86.

OPERATION OF THE PREFERRED EMBODIMENT

In operation, the optical system is adjusted and the electronic system is calibrated and provided with control signals by means of one or more dummy packages of known dimensions and distortions placed at the location of package 30 (FIGS. 1, 2). A package of unknown dimensions is then placed on mandrel 18 and rotated at approximately 200 revolutions per minute. The signal from detector 56D is first processed by multiplexer 64 to ascertain that core end 24 is properly seated against surface 20. Output from detectors 56A, 56B and 56C are then processed by the multiplexer to determine the average diameter and maximum diameter deviation and classify the package diameter according to preset standards contained in the memory. At the same time, differences between signals from detectors 56A and 56B and differences between signals from detectors 56B and 56C are individually determined electronically and provide signals indicating the extent of face dish or bulge. Signals from detectors 56E and 56I are employed to measure the freeboard at each end. This is possible with only two detectors since core 32 is precisely located at end 24 by mandrel surface 20 and the core itself has a precisely controlled total length.

Finally, telescoping or end bulge is determined from signals coming from certain remaining detectors. Selection of the appropriate detector among 56E—56H and among 56J—56L depends upon the previous measurement of average package diameter. For example, if the diameter falls in the maximum range, detectors 56H and 56L are used and their signals compared with signals from 56E and 56I respectively. For intermediate diameter packages, for example, 56G and 56K are sampled.

Thus, a range of sample sizes can be accommodated and the average diameter, maximum diameter deviation, face dish or bulge, length of freeboard, and severity of end telescoping or bulging can be determined with precision, automatically without package contact. In fact, it has been found possible by this device to measure dimensions to within ±0.005 in. (0.013 cm.).

Where less complex package measurements are desired, such as a single diameter determination and simple freeboard determinations at each end, it has been found possible to employ a modified design wherein the detector lenses are eliminated and a second concave mirror employed to project light back toward masked photodetectors.

In one arrangement of apparatus associated with this invention, multiple mandrels 18 and bearings 28 are mounted on an endless conveyor mechanism with means for indexing this mechanism. Then packages are loaded on mandrels at one position, indexed to the test position, and then moved to a sorting location where each package in turn is diverted according to the test results.

We claim:

1. In a device for measuring dimensions of an opaque object that includes a light source and a plurality of lenses coupled to a plurality of photosensitive detectors disposed on opposite sides of said object, said lenses being adapted to receive a portion of the light permitted to pass the periphery of the object and focus the light on the detectors which emit equivalent electrical signals, an apparatus for forming a wide collimated beam of light to cast an accurate shadow of said object on said lenses said apparatus comprising:
   a concave mirror located in spaced relation to said light source,
   said light source and said object being successively spaced one and two mirror focal length distances, respectively, from said mirror.

2. The apparatus of claim 1 wherein is provided means coupled to said object for rotation thereof and means for rotating said object at a constant speed.

3. The apparatus of claim 1 wherein is provided circuit means connected to said detectors for determining the amplitude of signals emitted therefrom and comparing said signals to preset standards for determining the dimensions of the object.

4. The apparatus of claim 1 wherein said light source and the center of said object are successively spaced one and two mirror focal length distances, respectively, from the center of said mirror.